United States Patent
Gupta et al.

(10) Patent No.: US 11,929,988 B2
(45) Date of Patent: Mar. 12, 2024

(54) DYNAMIC SELECTION OF A VPNC GATEWAY BASED ON USER BEHAVIOR

(71) Applicant: HEWLETT PACKARD ENTERPRISE DEVELOPMENT LP, Houston, TX (US)

(72) Inventors: Gopal Gupta, Bangalore (IN); Abhinesh Mishra, Bangalore (IN); Isaac Theogaraj, Bangalore (IN); Aseem Sethi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 175 days.

(21) Appl. No.: 17/171,963

(22) Filed: Feb. 9, 2021

(65) Prior Publication Data
US 2022/0255900 A1    Aug. 11, 2022

(51) Int. Cl.
*H04L 9/40* (2022.01)
*H04L 67/61* (2022.01)

(52) U.S. Cl.
CPC ........ *H04L 63/0272* (2013.01); *H04L 63/102* (2013.01); *H04L 63/105* (2013.01); *H04L 63/1425* (2013.01); *H04L 67/61* (2022.05)

(58) Field of Classification Search
CPC . H04L 63/0272; H04L 63/102; H04L 63/105; H04L 63/1425; H04L 41/5051; H04L 41/0893; H04L 67/61; H04L 43/50; H04L 63/20
See application file for complete search history.

(56) References Cited

U.S. PATENT DOCUMENTS

| | | | | |
|---|---|---|---|---|
| 10,623,285 | B1* | 4/2020 | Shevade | H04L 41/0654 |
| 10,992,543 | B1* | 4/2021 | Rachamadugu | H04L 43/04 |
| 11,108,638 | B1* | 8/2021 | Alluboyina | H04L 41/0893 |
| 2016/0036833 | A1* | 2/2016 | Ardeli | H04L 63/101 |
| | | | | 726/22 |

(Continued)

OTHER PUBLICATIONS

Wikipedia, "Differentiated Services", available online at <https://en_wikipedia_org/w/index.php?title=Differentiated_services&oldid=938701496>, Feb. 1, 2020, 7 pp.

*Primary Examiner* — Farid Homayounmehr
*Assistant Examiner* — Mudasiru K Olaegbe
(74) *Attorney, Agent, or Firm* — Sheppard Mullin Richter & Hampton LLP

(57) ABSTRACT

Systems and methods are provided for dynamic virtual private network concentrators (VPNC) gateway selection and on-demand VRF-ID configuration. A dynamic VPNC gateway selection component can dynamically route to a particular VPNC gateway based on multiple user-specific factors, including: a) behavior of users on the network; and b) performance of a destination service/device. A dynamic VPNC gateway selection component can rank a user based on one or more factors relating to the behavior of the user. Also, the dynamic VPNC gateway selection component can determine whether a VPNC gateway at a data center is healthy, and whether a destination service at the data center is healthy. The dynamic VPNC gateway selection component can dynamically select a VPNC gateway from a plurality of VPNC gateways at the data center for communicating forwarded traffic from the user based on the user's ranking if either the VPNC gateway or the service are unhealthy.

19 Claims, 10 Drawing Sheets

(56) References Cited

U.S. PATENT DOCUMENTS

| | | | | |
|---|---|---|---|---|
| 2016/0359878 A1* | 12/2016 | Prasad | ............... | H04J 3/0661 |
| 2019/0334983 A1* | 10/2019 | Largman | ............ | H04L 41/0668 |
| 2020/0106687 A1* | 4/2020 | Nambisan | .......... | H04L 12/2854 |
| 2020/0127911 A1* | 4/2020 | Gilson | ............... | H04L 43/0876 |
| 2021/0036913 A1* | 2/2021 | Gupta | ................ | H04L 41/082 |
| 2021/0352138 A1* | 11/2021 | Kodavanty | ........... | H04L 67/562 |
| 2022/0208319 A1* | 6/2022 | Ansari | ................ | G16H 10/60 |
| 2022/0217814 A1* | 7/2022 | Dhammawat | ........ | H04L 67/143 |

* cited by examiner

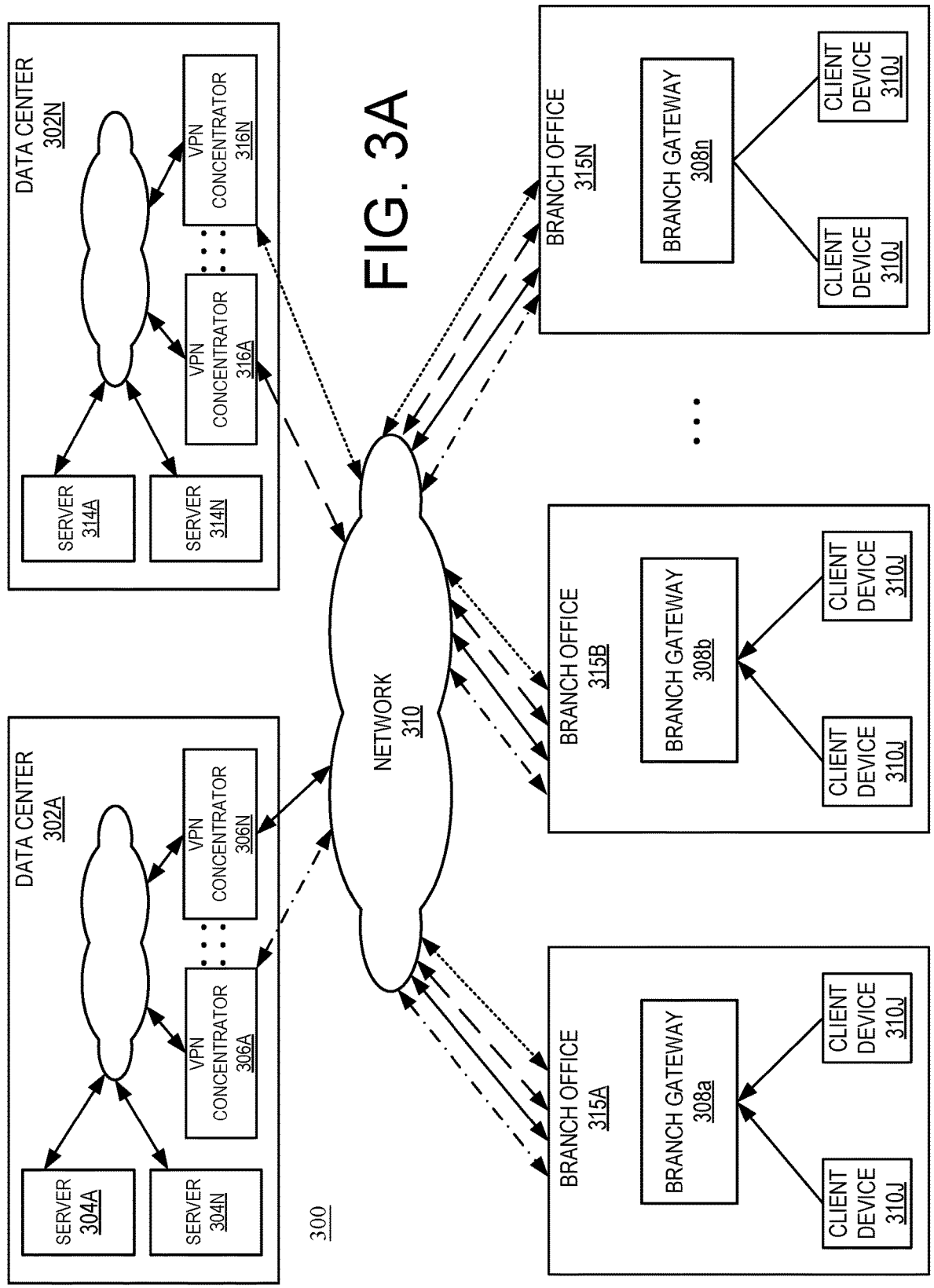

| VRF ID | Update Time | Update Since | Generation ID | | Route Prefix | AFI-SAFI | Originator ID | Next Hops |
|---|---|---|---|---|---|---|---|---|
| 0 | 2020-07-23 03:26:46 +0000 UTC | 31h 44m 23.30s | 159547475 | 2585702 | 192.168.19.176/28 | IPV4-UNICAST | 316 | Gw: 00:1a:1e:03:64:b0, PfxOrigType: SPOKE, ProtoType: OVERLAY, SiteId: 316, Cost: 10, |
| | | | | | | | | Gw: 00:1a:1e:03:59:38, PfxOrigType: SPOKE, ProtoType: OVERLAY, SiteId: 316, Cost: 20, |
| 0 | 2020-07-23 03:26:48 +0000 UTC | 31h 44m 24.30s | 159547475 | 2586666 | 12.18.19.176/28 | IPV4-UNICAST | 434 | Gw: 00:1a:1e:03:64:b0, PfxOrigType: SPOKE, ProtoType: OVERLAY, SiteId: 434, Cost: 10, |
| | | | | | | | | Gw: 00:1a:1e:03:59:38, PfxOrigType: SPOKE, ProtoType: OVERLAY, SiteId: 434, Cost: 20, |

MACHINE-READABLE STORAGE MEDIUM
750

```
ip vrf Test1
   description Test1
   rd 0:1
   route-target import 0:1
   route-target export 0:1
   !
ip vrf Test2
   rd 0:2
   !
```

VRF RULE
700

FIG. 7

DYNAMIC SELECTION OF A VPNC GATEWAY BASED ON USER BEHAVIOR

DESCRIPTION OF RELATED ART

The present disclosure generally to electronic data networks, and more particularly to software defined networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A illustrates an example of a Software Defined Wide Area Network (SD-WAN) in which the dynamic virtual private network concentrators (VPNC) gateway selection techniques can be implemented, according to some embodiments.

FIG. 4 illustrates an example of a mechanism for learning traffic routes for users in order to implement an on-demand VRF-ID configuration aspects of the dynamic VPN concatenator gateway selection techniques, according to some embodiments.

FIG. 7 depicts an example configuration of a VRF rule implemented via the disclosed on-demand VRF-ID configuration, according to some embodiments The figures are not exhaustive and do not limit the present disclosure to the precise form disclosed.

DETAILED DESCRIPTION

Figure 1:
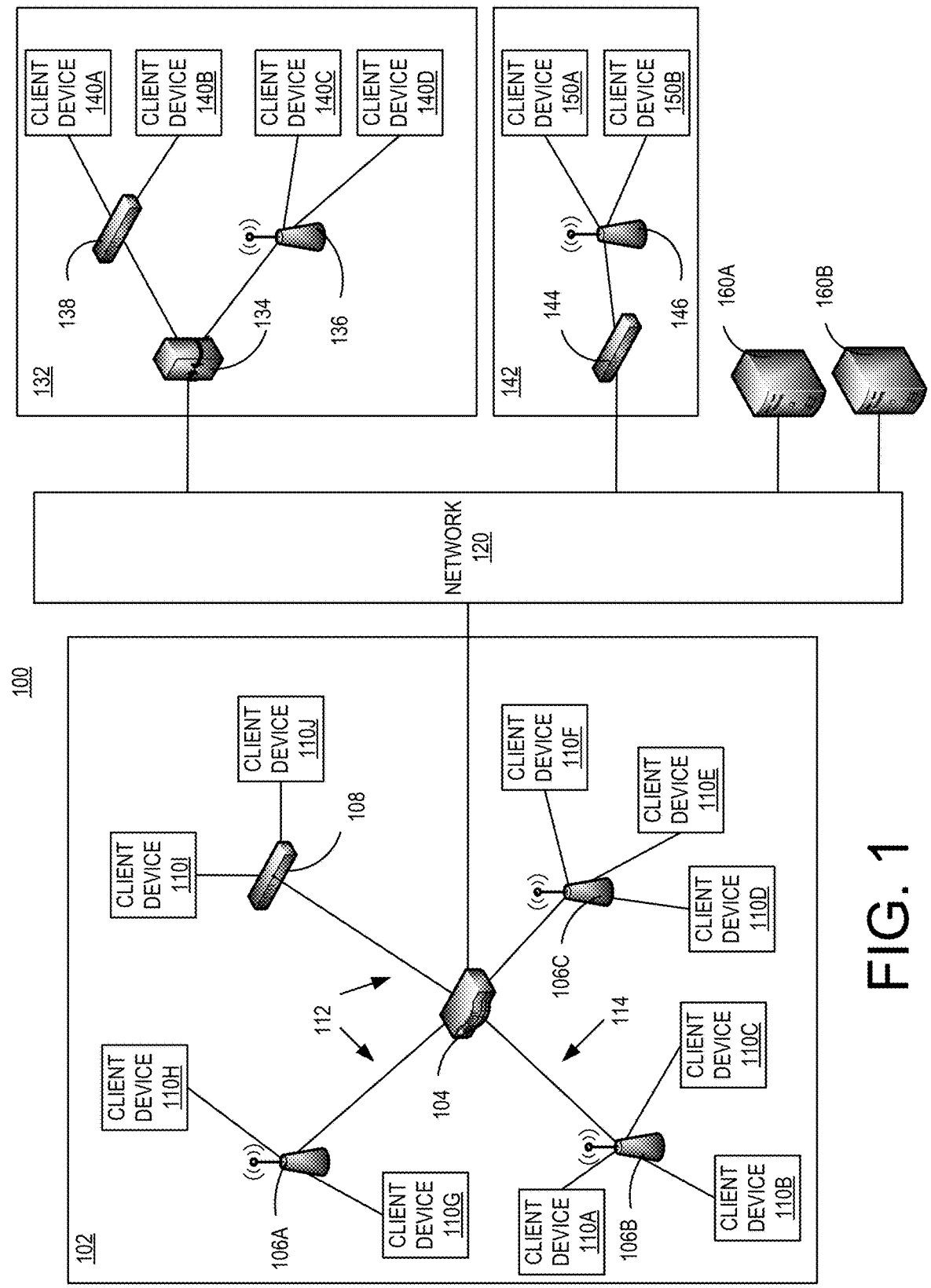
FIG. 1 illustrates one example of a network configuration that may be implemented for an organization, such as a business, educational institution, governmental entity, healthcare facility or other organization.

Virtual private networks (VPN) allow users to establish secure, private communications channels over unsecured public networks such as the Internet. These secure, private communications channels are commonly referred to as VPN tunnels. Networking devices referred to as VPN concentrators (VPNc) are employed to establish and configure these tunnels, to authenticate users, to assign tunnels to users, to ensure delivery of the data flowing through the tunnels, and to encrypt and decrypt the data. For ease of deployment and management, VPN concentrators are often grouped in clusters. The use of the VPN concentrator clusters allows efficient network management, for example by enabling load-balancing among the VPN concentrators in the cluster. One problem that arises in this environment is how to distribute VPN tunnels among the VPN concentrators in a cluster.

Furthermore, Software Defined Wide Area Network (SD-WAN) can play a pivotal role in providing intelligent connectivity in a distributed topology, such as between Branch Offices and Data Centers. As referred to herein, a SD-Wan is a virtual WAN architecture that allows enterprises to leverage various combination of transport services—including MPLS, LTE and broadband internet services—to securely connect users to applications.

An SD-WAN can use a centralized control function to securely and intelligently direct traffic across the WAN. This increases application performance and delivers a high quality user experience, that can resul in increased business productivity, agility and reduced costs for users.

In SD-WANs, a secured tunnel can be formed between Branch Office gateway (BG) and each VPNC present in all the of the topology. An order of preference for routing traffic to each VPNC in a VPNC cluster (also referred to herein as VPNC priority) can be established in the SD-WAN. For example, within a VPNC cluster in a Data Center, a VPNC can be designated as a primary VPNC, another VPNC in the VPNC cluster can be designated as a secondary VPNC and so on. According to this defined preference for VPNCs in the cluster, traffic is largely routed to the primary VPNC. Alternatively, there are some instances where traffic is routed to the secondary VPNC. This preference for VPNCs, or VPNC priority, can be configured manually in the BG.

In existing SD-WANs, a cost of route of each destination service can be determined for all the networks learned. During operation, in accordance with a conventional VPNC gateway selection approach implemented for the SD-WAN, such as Dynamic Path Steering (DPS) policy, a next hop VPNC gateway with minimal cost can be selected. Since the route cost is determined by the VPNC affinity as configured in the branch gateway, or the cost determined by PCM of a destination, the traffic is overwhelmingly forwarded to the primary VPNC gateway (e.g., lowest route cost VPNC). In other words, operation of conventional approaches is tuned such that the majority of the traffic is directed to the primary VPNC for the destination route (even more so in rather flat topologies). Although resources of the primary VPNC may be used frequently in the case, other VPNCs of the cluster often remain idle for significant amounts of time. For instance, secondary and lower priority VPNCs may become active only when the primary VPNC is unavailable (e.g., inoperable, loss of connectivity, off-line) or the service rendered by the selected Data Center goes down. With many generally unused VPNCs in a cluster, the selection scheme fails to optimize a network topology having multiple clusters of VPNCs deployed throughout the SD-WAN (e.g., having many resources available, but go unused). Conventional VPNC gateway selection approaches, as described above, are primarily static in terms of not being able to adjust how traffic is selectively distributed to the VPNCs in real-time and/or based on current conditions on the network, particularly the performance of the data centers. Static approaches fail to leverage user prioritization, end-to-end service health, and traffic customization in order to implement a more optimized distribution of traffic among the multiple VPNCs. There are some conventional approaches that have some generally adjustable aspects. For example, Policy Based Routing (PBR) does bring in some customization with respect to applications or highly selective users but fails in scaling, dynamic adaptation and splitting traffic across multiple VPNCs. The dynamic VPNC gateway selection and on-demand VRF-ID configuration systems and techniques disclosed herein are an enhancement over these existing approaches, by functioning dynamically based on a "user awareness." That is, the dynamic VPNC gateway selection techniques make routing decisions based on multiple dynamic and/or user-specific factors, including: a) behavior of users on the network; and b) health/performance of a destination service and/or VPNC gateway device. These disclosed dynamic VPNC gateway selection techniques not only adds an additional layer of traffic customization and granular traffic/session management, but also achieves some aspects of fault tolerance and self-healing of network. Consequently, the disclosed dynamic VPNC gateway selection techniques can realize various enhancements over currently existing routing and/or VPNC selection approaches used in SD-WANs (and VPNs), such as optimizing the use of resources, enhancing the user experience, and increasing network fault tolerance.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Figure 2:
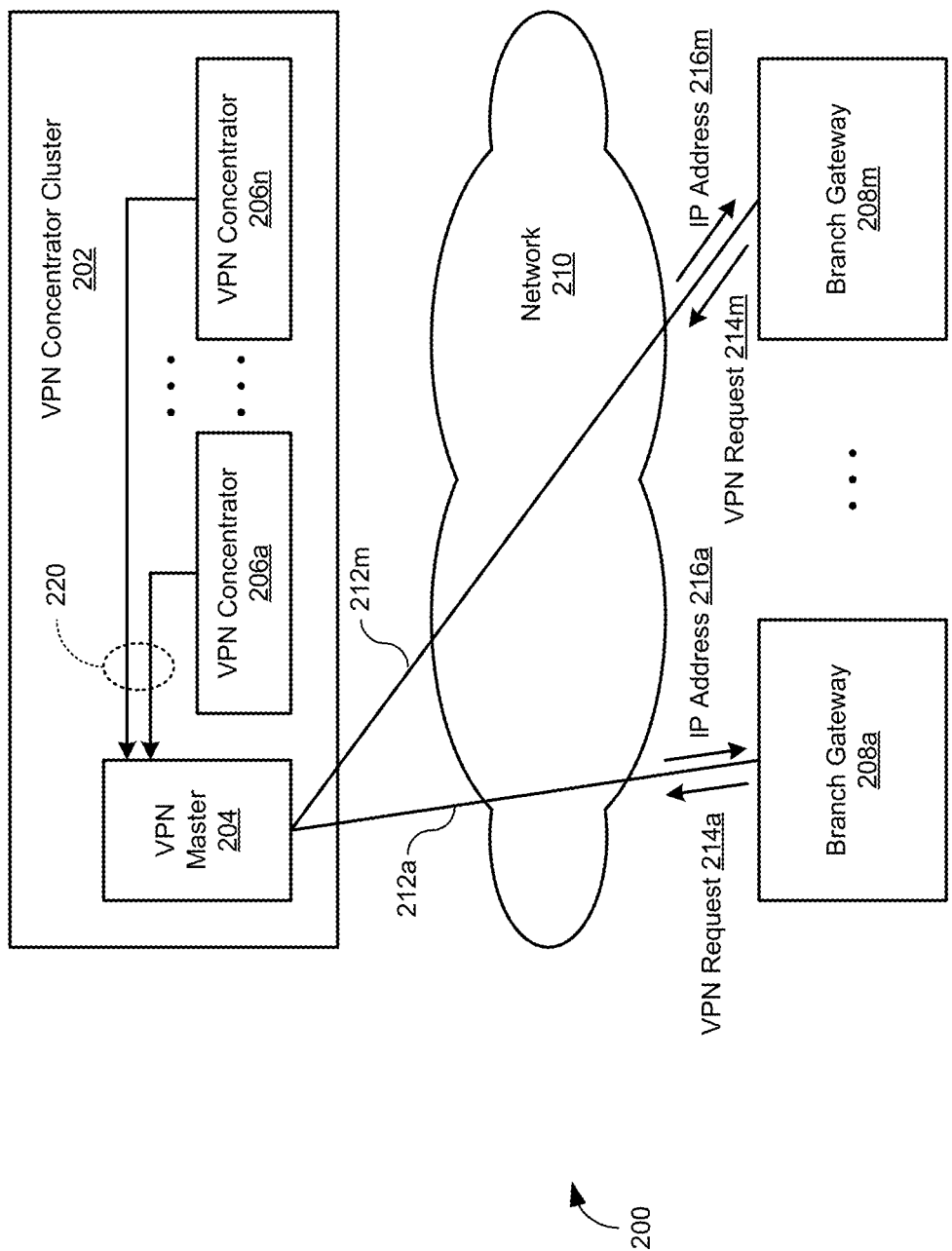
FIG. 2 illustrates an example Software Defined Wide Area Network (SD-WAN) system, according to some embodiments.

Various embodiments of the disclosed technology are now described. FIG. 2 illustrates an example VPN system according to one embodiment. Referring to FIG. 2, the VPN system 200 includes a VPN concentrator cluster 202. The VPN concentrator cluster 202 includes a VPN master 204, and a plurality of VPN concentrators 206a through 206n. The VPN master 204 may be implemented within a VPN concentrator 206, as a standalone device, or as a combination thereof. In FIG. 2, it is desirable to establish VPN tunnels with a plurality of branch gateways 208a through 208m over a network 210 such as the Internet. While the embodiment of FIG. 2 is described as establishing VPN tunnels with branch gateways, it should be understood that the disclosed technology may be employed to establish VPN tunnels with any network endpoint capable of supporting that function.

In the example of FIG. 2, each branch gateway 208 initiates a VPN tunnel by transmitting a VPN request 214 to the VPN master 204 in the VPN concentrator cluster 202 over a respective network connection 212. In response to the VPN requests 214, the VPN master 204 transmits a respective network address 216 to each branch gateway 208. Each network address 216 is the network address of one of the VPN concentrators 206 in the VPN concentrator cluster 202. Each network address 216 may be, for example, an Internet protocol (IP) address.

FIG. 3A depicts an example of a SD-WAN 300 in which the disclosed dynamic VPNC gateway selection techniques can be implemented. Unlike the traditional router-centric WAN architecture, the SD-WAN 300 can be designed to fully support applications hosted in on-premise data centers, shown as data centers 302a, and 302n in FIG. 3A. In the example, the SD-WAN 300 can have a topology that includes multiple branch offices 315a, 315b, and 315n and multiple Data Centers 302a, and 302n that are communicative connected by the communication network 310. The branch offices 315a-315n may be located in different geographical locations, and being connected to data centers 302a-302n that can be remotely distributed from the respective locations of the branch offices 315a-315n. In the example, each of the branch offices 315a-315n includes multiple client devices 310j that may be employed by users that are proximately located (on-site) to the respective branch office 315a-315n location. Further, each of the branch offices 315a-315n can have one of the branch office gateways (BGs) 308a-308n deployed thereon. Each of the BGs 308a-308n can serve as an interface for incoming and/or outgoing traffic for its respective branch offices 315a-315n. For example, branch gateway 308a can interface with uplink traffic from the client devices 310j at branch office 315a that is routed to the communications network 310, and interface with downlink traffic from the communications network 310 to be directed to an appropriate one of the client devices 310j.

Additionally, FIG. 3A illustrates that each of the data centers 302a-302n can have a cluster of VPNCs and multiple servers deployed thereon. In the example, data center 302a has a first cluster including VPNCs 306a-306n and servers 304a-304n, and data center 302n has a second cluster including VPNCs 316a-316n and servers 314a-314n. Thus, in operation, each of the BGs 308a-308n can form tunnels with these VPNCs 306a-306n, 316a-316n via WAN uplink(s) on either of the data centers 302a-302n. Secured tunnels can be formed between a BG and each VPNC present in the respective data center. For example, BG 308a can establish a secure tunnel with each of the VPNCs 306a-306n in the cluster at data center 302a. The order of preference of VPNC (or VPNC priority) can be configured manually on the BGs 308a-308n. In order to send traffic to a destination from among the data centers 302a-302n on the SD-WAN 300, an uplink may be selected by one of the BGS 308a-308n based on the dynamic VPNC gateway selection techniques as disclosed herein, and packets may get forwarded to a VPNC gateway designated as the primary VPNC gateway. The BGs 308a-308n may have instructions stored thereon which implement the dynamic VPNC gateway selection techniques. As an example, a rule of the dynamic VPNC gateway selection scheme may designate a VPNC gateway from the cluster to act as the primary VPNC gateway for the respective data center. A primary VPNC may be automatically or manually determined based on various factors (e.g., minimal route cost, preferred/prioritization, and the like), and then stored in the BGs 308a-308n to be referenced for routing traffic on the SD-WAN 300. As an example, the VPNC 306*a* may be selected as the primary VPNC gateway for data center 302*a*, and VPNC 316*a* selected as the primary VPNC gateway for data center 302*n*. Any remaining VPNC gateways in the cluster may be designated as a secondary or low priority VPNC gateway, or assigned various lower priority levels (e.g., priority levels lower than the a highest priority of the primary VPNC gateway). In general, a VPNC gateway in the cluster with the highest priority can be designated as the primary, and one or more VPNC gateways with lower priorities can act as secondary VPNC gateways. In many deployments, there can be more than two VPNC gateways present. A distinct priority for each of the VPNC gateways can be calculated and assigned by either the configuration or the cost of their path. In the example of FIG. 3A, VPNC gateway 316*n* may be designated as a secondary VPNC gateway for the data center 302*n*. It should be appreciated that on data centers having multiple VPNCs, more than one VPCN gateway can be designated as a secondary VPNC gateway or lower priority VPNC gateway.

As alluded to above, according to some current approaches, forwarding traffic to a VPNC gateway can depend on the next hop route on the BG, which is configured to statically send traffic to the designated primary VPNC in most scenarios. The reverse path, in these current approaches, the selected data center sends traffic from the primary VPNC. Thus, many existing approaches do not actually leverage the deployment of the other less preferred VPNCs, which typically do not become active until the primary VPNC goes down or the service rendered by the selected DC goes down. In contrast, the disclosed dynamic VPNC gateway selection techniques allow for dynamic adjustment of the VPNC gateway selection rule. According to the embodiments, rule(s) for forwarding traffic to a VPNC gateway is not limited to only routing to the primary VPNC gateway, but may also be dynamically updated based on additional factors, such as the behavior of the user (e.g., new user, critical user, etc.) and the conditions of the destination service/device at the data centers (e.g., device health, service health, etc.). For instance, conditions of the network may be monitored in real-time and it is detected that the health of the VPNC gateways 306*a*, which is the primary (or highest priority) VPNC gateway for its corresponding data center 302*a*, is degraded (even though the device is still available/on-line). Thus, the dynamic VPNC gateway selection techniques can dynamically adjust such that traffic is routed to the secondary (or low priority) VPNC gateway for the data center 302*a*, namely VPNC gateway 306*n*. Conversely, aforementioned existing approaches would continue to statically forward traffic to the VPNC gateway 306*a* even with its health jeopardized, because it is still the designated primary VPNC gateway and is still on-line. However, the dynamic VPNC gateway selection techniques can modify its function based on real-time conditions of the network, thereby re-routing traffic in a manner that may avoid further use of a primary VPNC gateway while its health is degraded (which can cause additional damage and/or reduced performance on the device). As previously described, in the current approaches failover to a secondary VPNC gateway rarely happens, and in most cases only when a device/service goes down completely. The disclosed techniques apply monitoring and/or tracking of a device's health and service's health for the VPNCs as a need-basis fault tolerance. Further, the disclosed techniques can dynamically select a VPNC gateway in a manner that realizes improvements over the current approaches, such as allowing the network to self-heal (e.g., re-using the primary VPNC gateway when its health improves) and adapting to potentially improve the quality of network communication and the user experience. The dynamic VPNC gateway selection techniques, as disclosed herein, can provide multiple advantages, including but not limited to:

1) Supporting a dynamic behavior that enables traffic customization and distribution of traffic in a manner that optimally employs multiple VPNC gateways deployed on the network;
2) Considering destination service/device performance while making a choice on the preferred VPNC; and
3) Supporting on-demand fault tolerance or network resiliency that is apart from redundancy failover.

Additionally, the dynamic VPNC gateway selection techniques can dynamically determine the uplink for a particular user (based on behavior) to reach the primary VPNC of the data center, and allows for traffic to be distributed across multiple VPNCs of a data center which can improve overall efficiency of the system (e.g., distributing/load balancing amongst multiple VPNC resources). Often times, VPNCs are not configured to act in an all active-active mode for BGs, primarily because of symmetric routing requirements. The disclosed embodiments can address this limitation by autonomously adjusting the selection rules based on the behavior of users, which provide various enhancements over conventional approaches that are manually configured, static in nature, agnostic to users of the traffic and require regular maintenance. For example, there may be thousands of users present across the branch offices 315*a*-315*n*. As will be described in greater detail, the dynamic VPNC gateway selection techniques can observe a user's behavior in order to dynamically adapt the selection rules based on at least two main categories of users, including: 1) critical users; and 2) new users. The disclosed techniques avoid having to implement thousands of per-user policies, and rather enables VPNC selection and traffic routing to have some form of user-based customization by using a high level approach (e.g., not requiring a specific policy be formed for each user) that is based more broadly on categories of users (dependent on their observed behavior) in order to achieve an optimal distributed usage of VPNCs. Generally, there can be multiple levels of customization of traffic for designated VPNC selection in accordance with the dynamic VPNC gateway selection techniques, by take a criticalness (e.g., priority) and/or behavior of users into account for traffic forwarding to the VPNC gateways. This enhanced level of customization supported by the disclosed techniques can provide more control and management of the traffic to the designated data centers than can be accomplished using more traditional approaches. Generally, the dynamic VPNC gateway selection techniques, as disclosed herein, support key features which include, but are not limited to:

1) User behavior based autonomous VPNC and/or data center selection;
2) On-demand autonomous VRF-ID configuration and/or removal; and
3) Data center services' performance based routing.

Figure 3B:
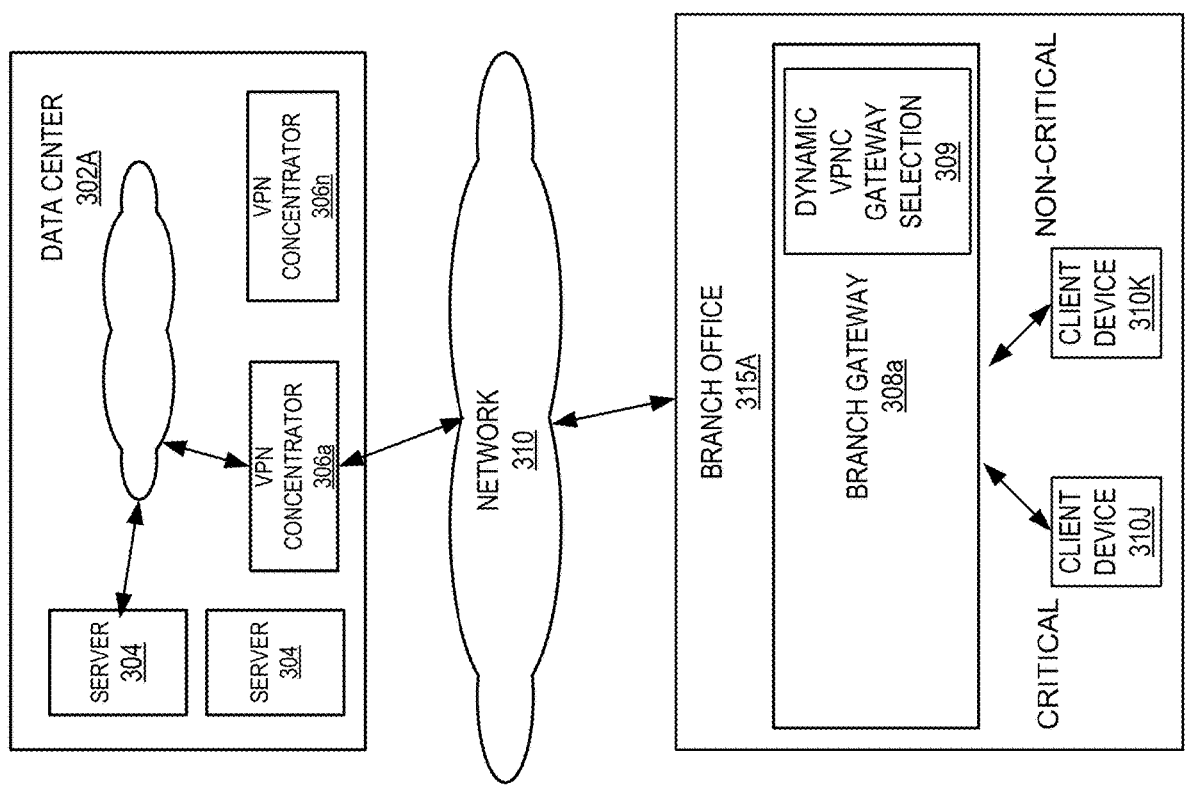
FIG. 3B illustrates an example of employing a dynamic VPN concatenator gateway selection technique in order to optimize traffic routing to the primary VPN concatenator and a secondary concatenator within a SD-WAN, according to some embodiments.

FIG. 3B illustrates an example operation of a branch gateway 308*a* that is configured with a dynamic VPNC gateway selection component 309 which implements dynamic selection of VPNC gateways in accordance with the disclosed techniques. It should be understood that the components and function of the systems shown in FIG. 3B-FIG. 3D (e.g., branch office, branch gateways, VPNC gateways, data centers, etc.) are substantively similar to those described in detail in reference to FIG. 3A. Thus, for purposes of brevity, the similar components and functions are not described again in detail with respect to FIG. 3A-FIG. 3B. The dynamic VPNC gateway selection component 309 can be implemented as a hardware and/or software computing component, such as may be, for example, a server computer, a controller, or any other similar computing component capable of processing data. In the example implementation of FIG. 3B, the dynamic VPNC gateway selection component 309 includes a hardware processor, and machine-readable storage medium. For example, a hardware processor may be one or more central processing units (CPUs), semiconductor-based microprocessors, and/or other hardware devices suitable for retrieval and execution of instructions stored in machine-readable storage medium. A hardware processor of the dynamic VPNC gateway selection component 309 may fetch, decode, and execute instructions, such as instructions to control processes or operations for dynamically selecting a VPNC gateway according to the techniques disclosed herein. As an alternative or in addition to retrieving and executing instructions, a hardware processor of the dynamic VPNC gateway selection component 309 may include one or more electronic circuits that include electronic components for performing the functionality of one or more instructions, such as a field programmable gate array (FPGA), application specific integrated circuit (ASIC), or other electronic circuits.

As alluded to above, the disclosed techniques can provide a user behavior based autonomous VPNC gateway and/or data center selection feature. Accordingly, the dynamic VPNC gateway selection component 309 is configured to dynamically monitor and/or track the behavior of users, for instance users associated with the client devices 310j at the branch office 315a, in a manner that ultimately enables autonomous VPNC/DC selection. According to the embodiments, the dynamic VPNC gateway selection component 309 can assign each user associated with the branch office 315a a score based on multiple different parameters related to the monitored behavior. These parameters can include, but are not limited to: a) location; b) bandwidth consumed by critical vs non-critical applications, c) QOS of the traffic; d) user reputation; e) user threat/security score; and f) user role. Then, each calculated score is further used to determine a criticality ranking that corresponds to the user. In the embodiments, the dynamic VPNC gateway selection component 309 can be programmed to apply a distinct user score calculation algorithm. The user score calculation algorithm is described in greater detail in reference to FIG. 4. Also, in scenarios where a user is associated with a plurality of devices, each device employed by a specific user is mapped to the same criticality ranking that is assigned to the user. Referring to the example in FIG. 3B, the dynamic VPNC gateway selection component 309 has assigned the user associated with the client device 310j to a "critical" criticality ranking, and the user associated with the client device 310k to a "non-critical" criticality ranking. In other words, based on their tracked behavior the user associated with the client device 310k is less critical than the user associated with the client device 310j. The client devices 310j and 310k can be ranked as per their criticality, the ranking being based on a score that is calculated by the user score calculation algorithm. As seen, traffic from both the of the client devices 310j, 310k is being directed to VPNC gateway 306a of the data center 302a by the BG 308a in accordance which the disclosed dynamic VPNC gateway selection techniques, which is consistent with conventional approaches (e.g., all traffic routed to the primary VPNC) in this particular example scenario.

Due to the aforementioned capabilities of the dynamic VPNC gateway selection component 309, the BG 308a has an awareness of the behavior of all the users in the system, thus functions to dynamically customize traffic forwarding intelligently. FIG. 3A particularly serves to illustrate an operational example where the status quo of the traffic is maintained. For instance, from a real-time monitoring of the conditions on the network, it may be determined that the health of VPNC gateways 306a-306n or the service rendered by the data center 302a are both good. Alternatively, in cases where the health of either is degrading to the point of falling below a set health/performance threshold, then the dynamic VPNC gateway selection component 309 can perform a migration of the traffic from clients that are new and less-critical (e.g., non-critical) to a secondary (or lower priority) VPNC gateway or data center. According to the embodiments, any currently existing sessions for client devices being supported by the data center are preserved. Selection of VPNC in the BG and the reverse path in the DC is achieved by dynamic on-demand configuration of pertinent import/export rules in VRF-ID for corresponding destination prefix. This user behavior and destination service performance aware dynamic system not only optimizes the usage of resources in the VPNCs but also fortifies network fault tolerance and self-heals the network.

In the example of FIG. 3A, the traffic for the selected destination from the BG 308a is sent to the corresponding primary VPNC gateway 306a. For all of the ECMP routes, traffic is sent to the same primary VPNC gateway, namely 306a. However, if the health of the primary VPNC gateway 306a or the service goes below a defined health/performance threshold value, the BG 308a (vis-à-vis the dynamic VPNC gateway selection component 309) can dynamically adjust to start sending the traffic from clients that are identified as 1) new users, and 2) less critical users to the secondary (or lower priority) VPNC gateway 306n. In some embodiments, in lieu of dynamically selecting a VPNC gateway, the techniques dynamically select a different data center to route traffic to.

Referring back to the scenario where the device health and service health of the primary VPNC gateway 306a are good, the BG 308a maintains any current flows from the client devices 310j and 310k, and would potentially migrates only the sessions from any new clients added to the branch office 315a that are also assigned a "non-critical" criticality ranking. Any new entries from less critical clients in the datapath table of the BG 308a can be used to decide the packet forwarding to the secondary VPNC gateway 306n of the data center 302a (or secondary data center) instead to the designated primary VPNC gateway 306a.

Figure 3C:
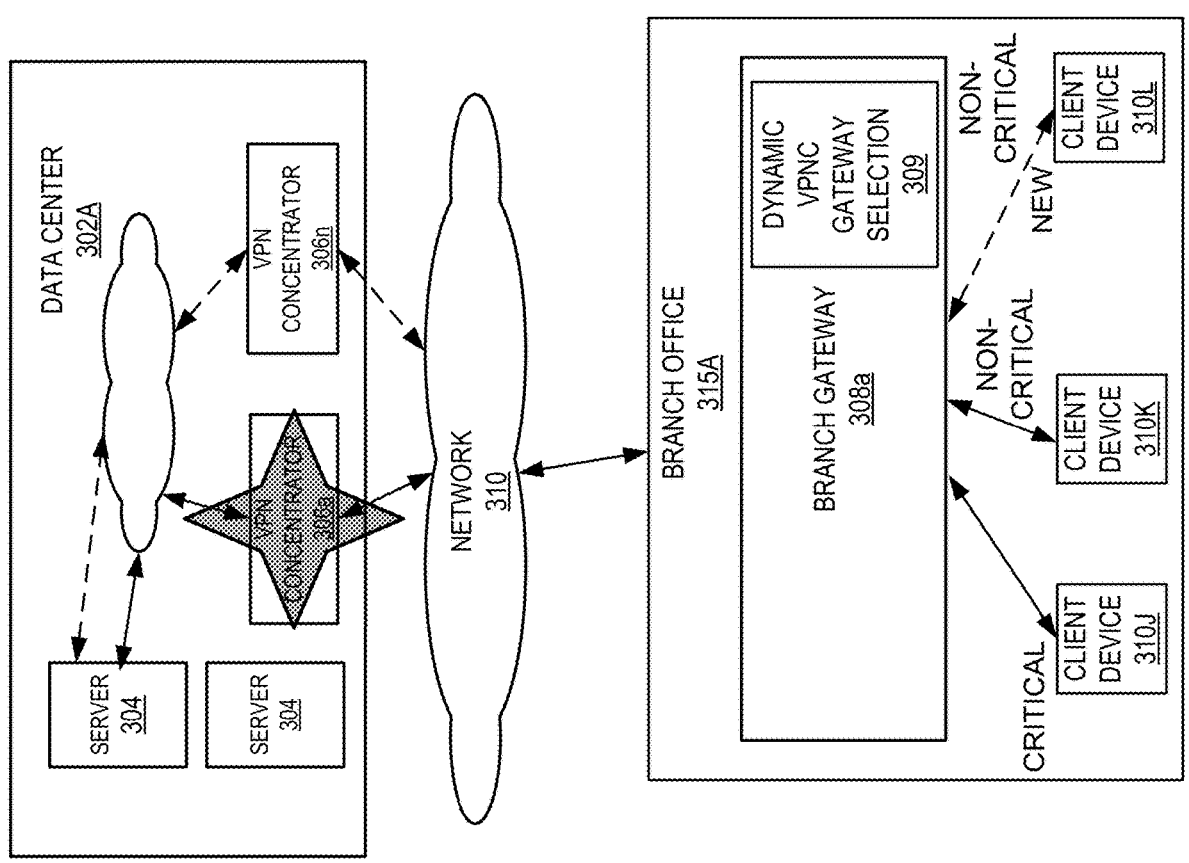
FIG. 3C illustrates another example of employing a dynamic VPN concatenator gateway selection technique in order to optimize traffic routing to the primary VPN concatenator and a secondary concatenator within a SD-WAN, according to some embodiments.

Referring now to FIG. 3C, another example operation of the BG 308a that is configured with the dynamic VPNC gateway selection component 309 is illustrated. As alluded to above, a key feature implemented by the dynamic VPNC gateway selection component 309 is observing and assessing the health (resource availability and performance) of VPNC. In other words, the dynamic VPNC gateway selection component 309 has the capability to perform measurements of performance of the destination service and devices on the network. Current TCP/UDP uplink health checks can be leveraged in a manner that enables the VPNC gateway selection component 309 to monitor (and subsequently measure) the dynamic health/performance of a particular device and a particular service rendered by the data center. For instance, relevant AMON messages are sent from the VPNC gateways 306a-306n at data center 302a, and ultimately communicated to the dynamic VPNC gateway selection to keep track of the resource availability on the device.

Particularly, in the example of FIG. 3C, it is determined that the health of the primary VPNC gateway 306a is degraded or otherwise reduced. For instance, there may be a significant amount of traffic being routed to the primary VPNC gateway 306a (e.g., large number of client sessions) that causes the device's resources to get choked up (indicated by dashed-line star). As a consequence, the users of client devices 310j and 310k, that are in current sessions with the destination 304 at data center 302a, may potentially experience a slow-down related to the impact on VPNC gateway 306a performance and health. However, by monitoring the conditions of the network, the dynamic VPNC gateway selection component 309 can detect that the resources on VPNC gateway 306a are below a defined health/performance threshold value in accordance with the techniques. The BG 308a can use this awareness to dynamically adjust, and subsequently select the secondary VPNC gateway 306n to receive the forwarded traffic from a new and non-critical (or less critical) client 310l. In other words, the BG 308a is configured to use awareness of the health of VPNC gateways in the network, and in particular the primary VPNC gateway 306a. In the example of FIG. 3C, the BG 308a applies the disclosed techniques to dynamically select the secondary VPNC gateway 306n in a manner that optimizes the user experience, for instance adjusting for the new client 310l, while preserving the existing sessions of the 310j, 310k. Furthermore, by implementing the disclosed dynamic VPNC gateway configuration aspects, the BG 308a can optimize the distribution of traffic to the multiple VPNCs 306a-306n on the data center 302a.

Figure 3D:
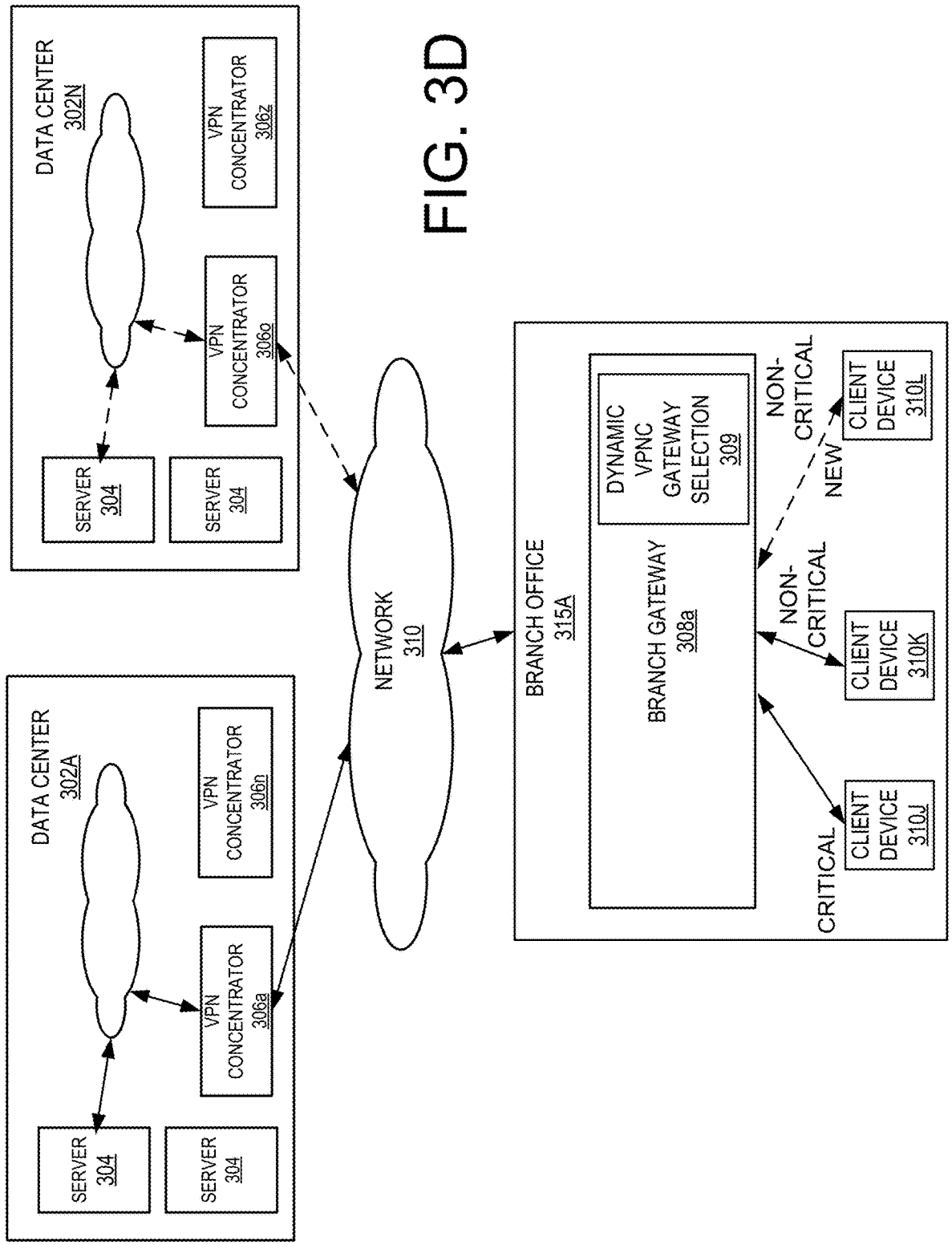
FIG. 3D illustrates yet another example of employing a dynamic VPN concatenator gateway selection technique in order to optimize traffic routing to the primary VPN concatenator and a secondary concatenator within a SD-WAN, according to some embodiments.

FIG. 3D illustrates yet another example operation of the BG 308a having the dynamic VPNC gateway selection component 309 therein. In addition to assessing device health, the dynamic VPNC gateway selection component 309 can also observe and assess the health of the service. Accordingly, in the example of FIG. 3D, the dynamic VPNC gateway selection component 309 may determine that the health of the service at the data center 302a is down. For instance, the BG 308a can forward uplink traffic to the network 310, in order to facilitate currently active sessions with the server 304 at data center 302a, and the client device 310j employed by a user deemed critical user (in accordance with the criticality ranking scheme) and client device 310j 10k employed by a user deemed less critical (in accordance with the criticality ranking scheme). While communicating with the data center 302a, the dynamic VPNC gateway selection component 309 can detect that the service being rendered by the server 304 in the data center 302a is under-performing, with respect to the health/performance threshold set on the component 309. In response to determining that the health of service in the data center 302a is degraded, the dynamic VPNC gateway selection component 309 can dynamically select to send traffic from a client device 310l to the primary VPNC gateway 306o of a secondary data center 302n rather than data center 302a in the same manner as the other currently active sessions. This VPNC gateway 306o can be defined as having a lower priority in a list of the VPNCs that are configured in the SD-WAN. In some embodiments, the configuration for a VRF-ID is done in the primary VPNC 306o of the secondary data center 302n. The BG 308a can be instructed by the dynamic VPNC gateway selection component 309, based on the configured VRF-ID, to send traffic for any new and less critical clients, such as the client device 310l, to this lower priority (or secondary) VPNC gateway 306o.

In accordance with the disclosed dynamic VPNC selection techniques, a BG can be programmed to initially attempt to send traffic to the primary (higher priority) VPNC gateway of a data center. The primary VPNC can configured in the CAAS as either the first VPNC for a primary data center, or the primary VPNC of another data center with a lowest route cost as learnt through the dynamic path forwarding through PCM. In either case, a rule can be added in the BG for a particular designated route and the corresponding list of VPNCs along with their costs as the Next Hops. FIG. 4 depicts an example of a table 400 that contain the VRF-ID, the destination prefix and the next-hop gateway list. For example, a table 400 can be sourced from a debug dashboard, and displays the routes learnt from the device. A next hop can be learnt using various mechanisms, for instance via configuration by the user or via calculating the shortest route by the PCM. In table 400, it is displayed that in order to reach network "192.168.19.176/28," there are two next hops available to the BG. The lowest cost (10) next hop is the VPNC with mac address "00:1a:1e:03:64:b0" and the higher cost (20) next hop is the VPNC with mac address "00:1a:1e:03:59:38."

Figure 5:
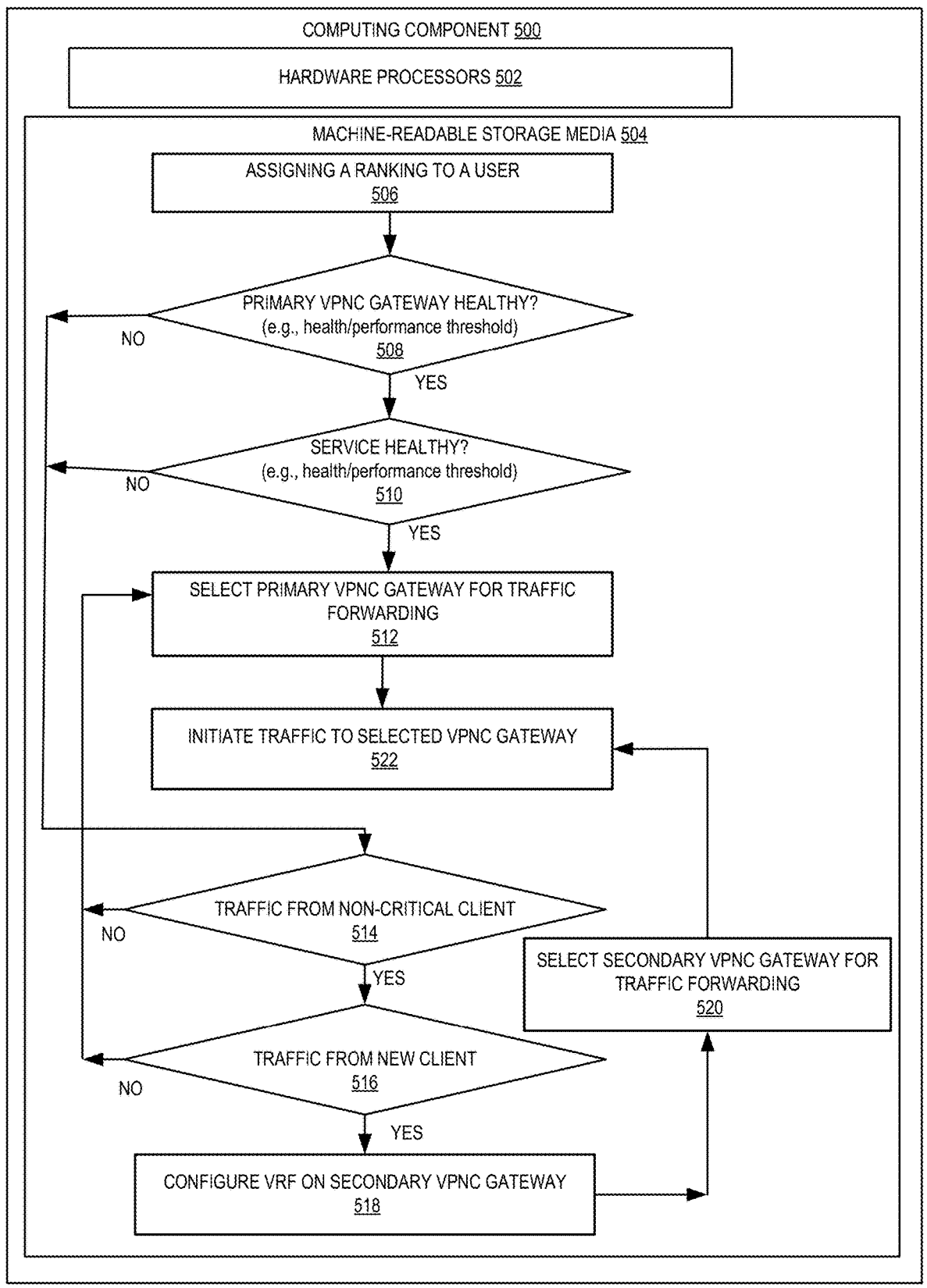
FIG. 5 is an example of a method for implementing the dynamic VPN concatenator gateway selection techniques, in accordance with some embodiments.

FIG. 5 illustrates a flow chart of a process 500 for implementing the disclosed dynamic VPNC gateway selection techniques. Furthermore, FIG. 5 shows process 500 as a series of executable operations stored on a machine-readable storage medium 504 performed by hardware processors 502, which can be the main processor of a computing component 500. For example, the computing component 500 can be the dynamic VPNC gateway selection component described at least in reference to FIG. 3B. In operation, hardware processors 502 execute the operations of process 500, thereby implementing the disclosed techniques.

In the example, the process 500 begins at operation 506 where one or more users are ranked. Each user can be associated with one or more client devices on a network, for instance a laptop computer at a branch office connected to the SD-WAN. Operation 506 can involve assigning the user a score that is calculated by applying a user score calculation algorithm, and then categorizing the user in a corresponding rank using their respective score. As a general description, the user score calculation algorithm considers various parameters that are related to the behavior of the user while on the network in order to calculate a score that is indicative of their behavior for the purposes of ultimately assigning a ranking to that user. These parameters can include, but are not limited to: a) location; b) bandwidth consumed by critical vs non-critical applications; c) Quality of Service (QOS) of the traffic; d) user reputation; e) user threat/security score; and f) user role. The score of each user can be calculated by the BG, or alternatively calculated by resources on the cloud and then pushed to the BG. Again, operation 506 can further involve categorizing the users into ranks based on the range of their score. As a result, the BG has an awareness of each users "behavior" based on their ranking. For example, a BG can have a list that includes the rank that corresponds to each user (and client device) present in the system. In some embodiments, if the a single user is associated with multiple devices on the network, for instance using a laptop computer, desktop computer, and a tablet computer, each of the multiple devices that are employed by that user is mapped to the same criticality ranking assigned to the user.

The user score calculation algorithm that can be applied at operation 506 is now described in detail. As a prerequisite or the algorithm, a location map or floor plan of all employees, AppRF data, Bandwidth consumption and QoS data of each user, net insight security events is generated. The score calculation can be performed in pseudo real-time, or on regular intervals, as defined by the administrator for example. By re-calculating (or updating calculations) user scores in a continuous manner, the disclosed techniques can maintain a "dynamic" aspect with respect awareness of the user's behavior. Particularly, the disclosed techniques generate a user score that is dynamic. A user's behavior on a network, such as SD-WAN, is typically not static, and can change as a user's needs and/or functions adjust. As an example, a user may be employed as a hardware engineer, and then transferred within the same company to a software engineering department. Consequently, the type of applications (e.g., bandwidth, QoS, etc.), permissions, roles, and other behaviors for that user on the company's network will change as it pertains to their change in job requirements and functions. By ensuring that the user score calculation algorithm re-calculates the user's score at various points in time, the techniques are capable of capturing this change in the user's behavior as reflected in a dynamically changing score. To provide score for users, the user score calculation algorithm uses the following factors.

1. Priority based on location: High priority location indicates the physical location where critical business tasks are getting executed. High priority locations (Sales Team, CEO office, Technical Support Team Area) are identified by the admin or taken from the visualRf floor map plan if available. Users in high priority location will be assigned high score. More important resources are more sensitive to the network outage; hence the score is kept high.
2. Priority based on bandwidth consumption by critical versus non-critical applications: This is based on percentage of critical applications and percentage of BW used by non-critical applications. User score is a representation of user behavior of accessing business critical and non-business critical applications. The user score is a weighted combination of percentage of bandwidth consumed by critical applications versus non-critical applications. An example of a mathematical representation of user bandwidth is shown in the equation below:
   User bandwidth score=(0.7*% of bandwidth consumed by critical applications)+(0.3*% of bandwidth consumed by non-critical applications) In the above equation low weightage is given to the % of bandwidth used by non-critical application. This is because, those users who are consuming more bandwidth for non-critical applications are penalize more to. An example of a mathematical representation of % of bandwidth consumption by a user is shown in the equation below:
   % of bandwidth consumed by critical applications of each user=(Total bandwidth consumed by critical applications of user)/(# total bandwidth consumed by critical applications of user+# total bandwidth consumed by non-critical applications of user)
3. Priority based on QOS of the traffic: This takes into consideration the QoS flow indicators given by the IP TOS/DSCP values. A user whose most traffic going to high priority queues will have high score. An example of a mathematical representation of a QoS score for a user is shown in the equation below:

$$\text{Interface\_qos\_score} = \Sigma \text{service\_type\_weight} * \% \text{ of\_packets\_in\_class\_type}$$

Weight can be allocated to different service types as defined in DSCP RFC 4594. The weights are implementation specific and can be assigned in the algorithm as per choice of implementation (e.g., highest weight to Expedited Forwarding, AF11-AF43 to have subsequent, CS0-CS7 will have relevant weights, default forwarding service to contain appropriate weight and so on and so forth).

4. Priority based on User Reputation: Reputation of the user is computed based on content accessed by the user. This will also take following parameter as Input:-Input: IP address, Time & day of the request & response, Web category, Web-reputation, File type, Content type, Bandwidth utilized Web Category Web reputation will be computed by looking for certain known patterns in different fields (like user-agent, IP, domain etc.) and scored them by Webroot/Brightcloud to get the IP reputation. If content accessed are high for an application but most of the Bytes (bandwidth) are consumed by sports/shopping category then user should be avoided less weightage. This can be achieved by assigning relative weight to each category. This may be already a part of AppRf feature. User reputation can be generated based on mathematic formulation or Machine Learning modelling of above factor or any other state of art. An example of a mathematical representation of a reputation score for a user is shown in the equation below:

$$\text{User\_reputation\_score} = (a*w \text{ app} + m*w \text{ url} + f*w \text{ file} + i*w \text{ ids } d*w \text{ dlp})$$

where a denotes a total number of unpermitted applications accessed by the client,
m denotes a total number of malware URL requests issued by the client,
f denotes a total number of banned file attachments and/or MIME types used in emails by the client,
i denotes a total number of anomalous intrusions detected for the client,
d denotes a total number of sensitive data breaches detected for the client, and
W denotes a weight assigned for class.

5. Priority based on User Threat/Security Score: Threat Score will be calculated based on the events related to individual user (severity, confidence score, stage) and the cross-event correlation information (e.g., the stage change across events) of associated devices or network. Event generation is typically done by tagging the flow which can be based on: a) Rule based cases, for example, DGA, HTTP header order detection, bit torrent etc.; and b) 3rd-party data correlation-based cases, for example, IOC, FireEye. Example of the events are DNS Exfiltration/DNS-Dictionary-DGA, HTTP header misspelling/Disordering, SSL expired Certificate/SSL-Inactive-Certificate, Suspicious-PDF, Spyware/adware access on user's devices, Hacker's tool on the device etc. An example of a mathematical representation of a security/threat score for a user is shown in the equation below:

$$\text{Entity\_Threat\_Score} = 0.5 * \text{maximum\_event\_score} + 0.25 * \text{attack\_stage\_feature} + 0.15 * \text{total\_score\_feature} + 0.10 * \text{detection\_type\_feature}$$

Definitions of other scores related to the threat/security of a user are shown below:
Maximum Event Score: max (event_score) Assigned to user if at least hits one or a few high-severity high-confidence events
Attack Stage Feature: # of attack stages hit by the user/total # of attack stages Detection Type Feature: # of detection types hit by the user/total # of detection types Total Score Feature: sum (event_scores)/max (sum (event_scores) of all users)

6. Priority based on User Role: Assign a score to each role in an organization (e.g., in a corporate context, CEO=0.8, senior vice president=0.6, executive level=0.5 etc. Guest user will have min score. Note that different roles can have the same score (e.g., a researcher can have the same score as a developer). This information can be obtained through an Identity and Access Management product.

A. Factor Score Preprocessing:

All factor's score are normalized by a Z-score or any mathematical variant before calculating the score. This helps in detecting the outliers and comparison between independent features. Z-score can be easily change to percentile scale in case need of range between 0-1 with the help of probability density functions.

X-Normalized=$(x-\mu)/s$ where:

$\mu$ is the mean of the population.

s is the standard deviation of the population

An example of a mathematical representation of a reputation score for a user is shown in the equation below:

User Score=$w1*Luser+w2*Buser+w3*Quser+w4*RPuser+w5*Tuser+w6*RL$ $w1,w2,w3,w4,w5,w6,w7$ are weight related to respective parameters subjected to condition $w1+w2+w3+w4+w5+w6+w7=1$ and $0<w1<1, 0<w2<1, 0<w3<1, 0<w4<1, 0<w5<1, 0<w6<1, 0<w7<1$ Luser=Normalized location of the user [0, 1]
Buser=Normalized score based on Bandwidth [0, 1]
Quser=Normalized score based on QoS queues [0, 1]
RPuser=Normalized user Reputation value [0, 1]
Tuser=Normalized threat score [0, 1]
RLuser=Normalized score based on role [0, 1]

The score calculation is quite open and versatile. Weightages can be assigned 0 if a particular parameter has to be removed from consideration of score calculation.

As previously described, the abovementioned user score calculation algorithm can be applied to generated user scores for multiple user of client devices on the network in operation 506 in order to ultimately rank the users. For example, user scores resulting from calculations according to the user score calculation algorithm can be maintained in an appropriate data structure, as shown in the table 1 below, and accessed for subsequent use:

| User | User Score Calculation $w1*Luser + w2*Buser + w3*Quser + w4*RPuser + w5*Tuser + w6*RLuser$ | Final score |
|---|---|---|
| A | 0.2 * 0.2 + 0.4 * 0.7 + 0.2 * 0.6 + 0.2 * 0.6 + 0.4 * 0.5 + 0.2 * 0.4 | 0.84 |
| B | 0.2 * 0.1 + 0.4 * 0.6 + 0.2 * 0.4 + 0.2 * 0.5 + 0.4 * 0.3 + 0.2 * 0.2 | 0.70 |
| C | 0.2 * 0.1 + 0.4 * 0.2 + 0.2 * 0.2 + 0.2 * 0.1 + 0.4 * 0.1 + 0.2 * 0.2 | 0.24 |
| D | 0.2 * 0.3 + 0.4 * 0.8 + 0.2 * 0.5 + 0.2 * 0.7 + 0.4 * 0.6 + 0.2 * 0.3 | 0.92 |
| E | 0.2 * 0.1 + 0.4 * 0.1 + 0.2 * 0.1 + 0.2 * 0.1 + 0.4 * 0.1 + 0.2 * 0.1 | 0.16 |

Next, process 500 can proceed to operation 508 where a conditional check is performed to determine whether a primary VPNC gateway for a particular data center is healthy. As previously alluded to, key features of the disclosed dynamic VPNC gateway selection techniques include observing and assessing the health (e.g., resource availability and performance) of a service and a VPNC gateway device itself. A health/performance threshold limit can be defined as an indication of a least acceptable measurement of health for a device and/or service. Restated, if a currently measured (or monitored) health of the primary VPNC gateway is compared against the health/performance threshold, and determined to be lower than the threshold, then the check in operation 508 can determine that the health of the primary VPNC gateways has degraded to an unacceptable level (e.g., VPNC has slowed down to a point of negatively impacting client connectivity). According to the embodiments, the health/performance threshold is set in such a way, that at the point of meeting the threshold there is enough capacity to serve all critical (e.g., higher priority) users who are currently associated with the network, in addition to a number of critical users that may potentially join the network in the future. In some embodiments, separate thresholds are used to correspond to the health of the device (or VPNC), and the health of the service, respectively.

Alternatively, if the currently measured health for the primary VPNC gateway is determined to be greater than the health/performance threshold, then operation 508 has determined that the primary VPNC gateway for the data center is healthy (shown as "Yes" in FIG. 5). In response, the process 500 then continues to check the health of the service. At operation 510 another conditional check is performed to determine whether the service at the data center is healthy. According to the embodiments, operations 508 and 510 can employ uplink health checks that are implemented in protocol standards, such as TCP/UDP or Internet Control Message Protocol (ICMP), as a mechanism to dynamically monitor the health/performance of a particular device and/or service rendered by the data center. Similar to the previous operation, a currently measured health for the service can be compared to a health/performance threshold in operation 510 in order to determine whether the service rendered by the data center is healthy.

In the case where the measured service health is greater than the health/performance threshold (shown as "Yes" in FIG. 5), this indicates that the health of both the device and the service associated with the primary VPNC gateway are acceptable enough to select the primary VPNC gateway for use. After the service is deemed healthy at operation 510, then the process 500 can continue to operation 512 where the primary VPNC gateway is dynamically selected for traffic forwarding for the user.

Otherwise, in the case where it is determined that the VPNC gateway health (in operation 508) or the service health (in operation 510) is less than the health/performance threshold (shown as "No" in FIG. 5), then process 500 has determined that the performance/health is not at an accept-
able level for selecting the primary VPNC gateway and the selection scheme should be adjusted. For instance, if the primary VPNC gateway has a substantively degraded performance, continuing to use the primary VPNC gateway as the default for receiving all traffic (e.g. additional traffic for new client devices) may further compromise the health of the device, as well as further choke the VPNC in a manner that affects the users' experience. Consequently, when the process 500 detects that the health/performance for either the device (e.g., primary VPNC gateway) or the service is down (e.g., less than the health/performance threshold), it then enters into a portion of the scheme that can dynamically adjust the configuration in a manner that allows the traffic to be distributed to secondary VPNC gateways (or data centers) to help prevent more severe health/performance issues from forming at the primary VPNC gateway.

The process 500 continues to the "adjustment" portion of the scheme at operation 514, where the operation adjusts from selecting the primary VPNC gateway, in order to potentially migrate traffic to a secondary VPNC (or data center). Operation 514 involves performing a conditional check that determines whether the current traffic is associated with a user that has been ranked as "less critical" (or non-critical) at previous operation 506. This can involve referencing a stored and/or maintained list of clients and their corresponding scores/ranks on a network device.

In the case where operation 514 determines that the traffic is associated with a "less critical" client (shown as "Yes" in FIG. 5), then the process 500 continues to operation 516. At operation 516, an additional conditional check is performed in order to determine whether the traffic is associated with a new client. For example, if the traffic is associated with a client device that has newly joined the SD-WAN or does not have a current session, then the process 500 can identify them as a new client. In the case where the traffic is deemed to come from a new client device in operation 516, this indicates that adjusting the selection scheme may be appropriate for this user. Accordingly, the process 500 proceeds to operation 518.

Alternatively, in instances where operation 514 determines that the traffic is associated with a critical client (e.g., not associated with a "less critical" client) (shown as "No" in FIG. 5) or operation 516 determines that the traffic is not associated with a new client device (shown as "No" in FIG. 5) the process 500 returns to operation 512. Consequently, based on the behavior assessed for the particular user, the primary VPNC gateway is selected for forwarding their traffic. In other words, the dynamic VPNC gateway selection techniques do not disturb traffic sessions of existing (e.g., not a new client) and critical users (e.g., not a "less critical" user), thereby allowing them to continue their session with the primary VPNC gateway.

However, when the user's behavior indicates to the process 500 that the user is new and "less critical" (e.g., user with a lower user score, and rank lower than a critical ranking), this suggests that: 1) the user has just started sending traffic to the data center; 2) does not have an entry in datapath; 3) the user does not have an existing session to be interrupted by re-routing its traffic to another VPNC. As a result, dynamcally adjusting the scheme to send traffic to a secondary VPNC gateway would not be intrusive, or substantively impact the experience of for a new and "less critical" user. Therefore, the process 500 begins to dynamically configure the VRF-ID so as to select a different VPNC gateway (or data center) for this user based on their observed behavior. Also, operation 514 and operation 516 may also determine a less critical client for whom uplink has flapped, and its session has to be restarted as a new client.

Next, at operation 518, the VRF can be configured at the secondary VPNC gateway. For example, operation 518 can involve adding a VRF-ID route-target import and route-target export configuration for the user, whom has been identified as a new and less critical user. The VRF is configured at the secondary VPNC gateway for reverse traffic, and the same VRF color tag configuration can be added to the BG. As background, routes can be advertised with VRF-ID in an overlay network topology. Rules can be added to a VRF on a VPNC gateway and/or the BG, where the rules govern whether to import/export routes of the corresponding VRF-ID. In some embodiments, configuring the VRF in operation 518 is done in Configuration As a Service (CAAS). In some cases, the routes of the configured VRF-ID can be learned and advertised only by the device which stores the configuration (e.g., other devices are not aware of the route). Thus, the VRF can be dynamically configured in operation 528 to include a route that sends traffic from the particular new and "less critical" client to the secondary VPNC in manner that selects the VPNC to provide a best user experience and network resiliency when the health at the primary VPNC gateway is down.

Subsequently, at operation 520, based on the configuration at previous operation 518, the secondary VPNC gateway (or data center) is selected for traffic forwarding. Thereafter, at operation 522 sending the traffic to the selected VPNC gateway can be initiated. For instance, subsequent to operation 512 forwarding traffic to the primary VPNC gateway is imitated in operation 522. In the scenario where operation 522 follows operation 520, then operation 522 initiates traffic forwarding to the secondary VPNC gateway.

FIG. 7 depicts an example configuration for a VRF rule 700. FIG. 7 shows an example of a configuration for a VRF rule 700 that can be programmed on the secondary VPNC gateway to define an imported target route, and an exported target route. The VRF rule 700 is shown to be stored a machine-readable storage medium 750. A machine-readable storage medium, such as machine-readable storage medium 750, may be any electronic, magnetic, optical, or other physical storage device that contains or stores executable instructions. Thus, machine-readable storage medium 750 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 750 may be a non-transitory storage medium, where the term "non-transitory" does not encompass transitory propagating signals. As described in detail below, machine-readable storage medium 750 may be encoded with executable instructions, for example, instructions shown in the VRF rule 700. A hardware processor may execute instructions of the VRF rule 700 to perform dynamic selection of a VPNC gateway. In some embodiments, the VRF rule 700 is configured dynamically, or on-demand, via the disclosed techniques.

Figure 6:
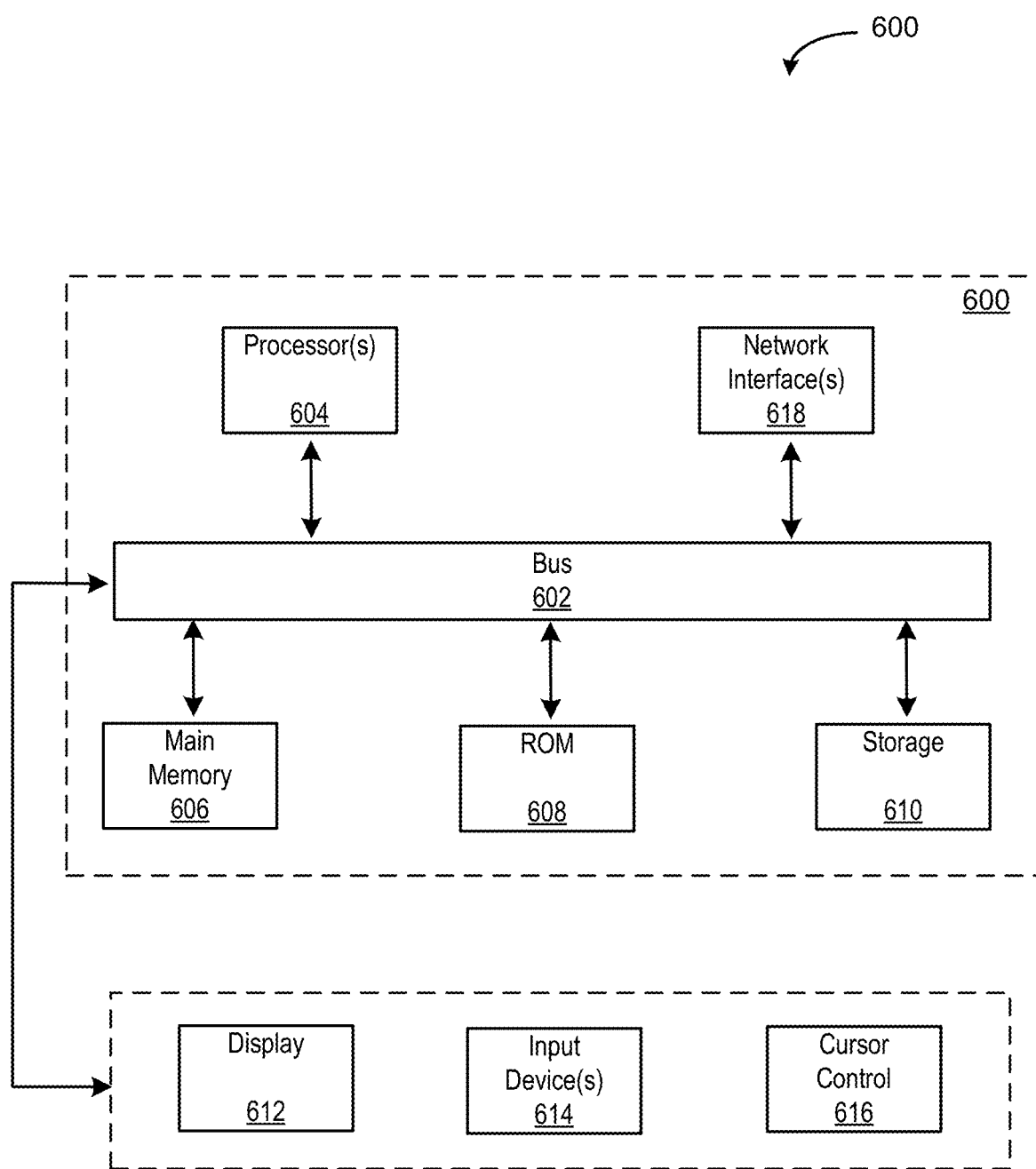
FIG. 6 is a block diagram of an example computing component or device for implementing the dynamic VPN concatenator gateway selection techniques, in accordance with one embodiment.

FIG. 6 is a block diagram of an example computing system or device 600 where various of the embodiments described herein may be implemented. The computer system 600 can implement the dynamic VPNC gateway selection techniques, as disclosed herein. For instance, the computer system 600 can be embodied as the dynamic VPNC gateway selection component (shown in FIGS. 3B-3D) or as another element of a branch gateway (BG) for performing the disclosed techniques.

As shown, the computer system 600 includes a 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 1206 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    assigning criticality rankings to users based on one or more factors relating to behaviors of the users;
    determining, by a branch gateway comprising a hardware processor, whether a primary virtual private network concentrator (VPNC) gateway is healthy, wherein the primary VPNC gateway is from a plurality of VPNC gateways across one or more data centers, the primary VPNC gateway to receive forwarded traffic from devices of the users, including a first device of a first user and a second device of a second user;
    determining, by the branch gateway, whether a service is healthy, wherein the service is provided by a data center of the one or more data centers; and
    based on a determination that the service is not healthy or a determination that the primary VPNC gateway is not healthy;
        determining, by the branch gateway, whether the first user associated with the first device has a non-critical ranking and whether the first device from which first traffic is received is a new client device that has newly joined a network,
        based on a determination that the first user has the non-critical ranking and the first device is a new client device, dynamically selecting, by the branch gateway, a secondary VPNC gateway from the plurality of VPNC gateways across the one or data centers for communicating the first traffic from the first device forwarded from the branch gateway to the secondary VPNC gateway,
        determining, by the branch gateway, whether the second user associated with the second device has a critical ranking and whether the second device from which second traffic is received is a new client device that has newly joined the network, and
        based on a determination that the second user has the critical ranking or the second device is not a new client device, preserving, by the branch gateway, a selection of the primary VPNC gateway for communicating the second traffic from the second device forwarded from the branch gateway to the primary VPNC gateway.

2. The method of claim 1, wherein determining that the primary VPNC gateway is healthy comprises:
    dynamically measuring a device health associated with the primary VPNC gateway;
    comparing the measured device health with a health/performance threshold; and
    determining that the measured device health is greater than the health/performance threshold.

3. The method of claim 2, wherein the measured device health is associated with at least one of: a resource availability of the primary VPNC gateway or a performance of the primary VPNC gateway.

4. The method of claim 3, wherein dynamically measuring the device health associated with the primary VPNC gateway comprises performing one of Transmission Control Protocol (TCP) health check, a User Datagram Protocol (UDP) health check, or an Internet Control Message Protocol (ICMP) health check for the primary VPNC gateway.

5. The method of claim 1, wherein assigning a ranking to a user of the users comprises:
calculating a user score for the user, wherein the user score is based on the one or more factors relating to a behavior of the user, and
assigning a critical ranking or a non-critical ranking to the user based on the user score.

6. The method of claim 5, wherein the one or more factors relating to the behavior of the user comprises one or more of: a location of the user, a bandwidth consumed by an application used by the user, a quality of service (QoS) of traffic associated with the user, a reputation of the user, a threat or security score of the user, or a role of the user.

7. The method of claim 5, wherein the user score for the user dynamically changes over time as the one or more factors relating to the behavior of the user change.

8. The method of claim 1, wherein the data center at which the service is provided is a first data center, the method comprising:
based on the determination that the service is not healthy and based on the determination that the first user has the non-critical ranking and the first device is a new client device, dynamically selecting, by the branch gateway, the secondary VPNC gateway that is in a second data center different from the first data center.

9. The method of claim 1, wherein dynamically selecting the secondary VPNC gateway comprises dynamically configuring a virtual routing and forwarding (VRF) route at the secondary VPNC gateway for traffic of the first user.

10. A system comprising:
a branch gateway comprising a hardware processor and a non-transitory storage medium comprising instructions executable on the hardware processor to:
assign criticality rankings to users based on one or more factors relating to behaviors of the users;
determine whether a primary virtual private network concentrator (VPNC) gateway is healthy, wherein the primary VPNC gateway is from a plurality of VPNC gateways across one or more data centers, the primary VPNC gateway to receive forwarded traffic from devices of the users, including a first device of a first user and a second device of a second user;
determine whether a service is healthy, wherein the service is provided by a data center of the one or more data centers; and
based on a determination that the service is not healthy or a determination that the primary VPNC gateway is not healthy:
determine whether the first user associated with the first device has a non-critical ranking and whether the first device from which first traffic is received is a new client device that has newly joined a network,
based on a determination that the first user has the non-critical ranking and the first device is a new client device, dynamically select a secondary VPNC gateway from the plurality of VPNC gateways across the one or data centers for communicating the first traffic from the first device forwarded from the branch gateway to the secondary VPNC gateway, wherein the secondary VPNC gateway is different from the primary VPNC gateway,
determine whether the second user associated with the second device has a critical ranking and whether the second device from which second traffic is received is a new client device that has newly joined the network, and
based on a determination that the second user has the critical ranking or the second device is not a new client device, preserve a selection of the primary VPNC gateway for communicating the second traffic from the second device forwarded from the branch gateway to the primary VPNC gateway.

11. The system of claim 10, wherein the instructions are executable on the hardware processor to dynamically monitor a health of each of the plurality of VPNC gateways.

12. The system of claim 11, wherein the instructions are executable on the hardware processor to dynamically assess whether the primary VPNC gateway is healthy or not healthy based on the monitored health.

13. The system of claim 10, wherein the data center at which the service is provided is a first data center, and wherein the instructions are executable on the hardware processor to:
based on the determination that the service is not healthy and based on the determination that the first user has the non-critical ranking and the first device is a new client device, dynamically select the secondary VPNC gateway that is in a second data center different from the first data center.

14. The system of claim 10, wherein the instructions are executable on the hardware processor to:
assign a ranking to a user of the users based on a user score computed according to a behavior of the user on the network, the user score computed based on one or more factors comprising: a location of the user, a bandwidth consumed by an application used by the user, a quality of service (QoS) of traffic associated with the user, a reputation of the user, a threat or secured score of the user, or a role of the user.

15. The system of claim 14, wherein the user score for the user dynamically changes over time as the one or more factors relating to the behavior of the user change.

16. The system of claim 10, wherein the data center at which the service is provided is a first data center, and wherein the instructions are executable on the hardware processor to:
based on the determination that the primary VPNC gateway is not healthy and based on the determination that the first user has the non-critical ranking and the first device is a new client device, dynamically select the secondary VPNC gateway that is in the first data center.

17. The system of claim 12, wherein a health of the primary VPNC gateway is based on a resource availability of the primary VPNC gateway or a performance of the primary VPNC gateway.

18. A non-transitory machine-readable storage medium comprising instructions that upon execution cause a branch gateway to:
assign a ranking to a user based on one or more factors relating to a behavior of the user, wherein the user is associated with a client device, wherein assigning the ranking to the user comprises calculating a user score for the user based on the one or more factors relating to the behavior of the user, and assigning a critical ranking or non-critical ranking to the user based on the user score;

determine whether a primary virtual private network concentrator (VPNC) gateway is healthy, wherein the primary VPNC gateway is from a plurality of VPNC gateways across one or more data centers of a network to receive forwarded traffic from the user;

in response to determining that the primary VPNC gateway is healthy, determine whether a service is healthy, wherein the service is provided by a destination at a data center of the network;

in response to determining that the service is healthy, select the primary VPNC gateway to receive the forwarded traffic from the user; and in response to determining that the service is not healthy or in response to determining that the primary VPNC gateway is not healthy:

determine whether the user is a non-critical user based on the ranking assigned to the user, in response to determining that the user is a non-critical user, determine whether the client device associated with the user is a new device to the network, and in response to determining that the client device is newly added to the network, dynamically select a secondary VPNC gateway from the plurality of VPNC gateways across the one or data centers for communicating the forwarded traffic from the user.

19. The non-transitory machine-readable storage medium of claim 18, wherein dynamically selecting the secondary VPNC gateway comprises dynamically configuring a virtual routing and forwarding (VRF)-ID with a rule to route reverse traffic from the selected secondary VPNC gateway at the data center to the client device associated with the user.

* * * * *